(12) United States Patent
Raghavan et al.

(10) Patent No.: US 11,748,334 B2
(45) Date of Patent: Sep. 5, 2023

(54) TECHNIQUES FOR DATA ASSET DISCOVERY

(71) Applicant: Oracle International Corporation, Redwood Shores, CA (US)

(72) Inventors: Gopal Srinivasa Raghavan, Bangalore (IN); Sathesh Kumar Murthy, Bengaluru (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 68 days.

(21) Appl. No.: 17/393,209

(22) Filed: Aug. 3, 2021

(65) Prior Publication Data

US 2022/0391380 A1 Dec. 8, 2022

(30) Foreign Application Priority Data

Jun. 4, 2021 (IN) .............................. 202141024954

(51) Int. Cl.
| | |
|---|---|
| G06F 7/00 | (2006.01) |
| G06F 17/00 | (2019.01) |
| G06F 16/23 | (2019.01) |
| G06F 16/215 | (2019.01) |
| G06F 21/62 | (2013.01) |
| G06F 21/31 | (2013.01) |
| G06F 21/60 | (2013.01) |
| G06F 16/27 | (2019.01) |

(52) U.S. Cl.
CPC ........ *G06F 16/2365* (2019.01); *G06F 16/215* (2019.01); *G06F 16/2358* (2019.01); *G06F 16/27* (2019.01); *G06F 21/31* (2013.01); *G06F 21/604* (2013.01); *G06F 21/6218* (2013.01)

(58) Field of Classification Search
None
See application file for complete search history.

(56) References Cited

U.S. PATENT DOCUMENTS

| | | | |
|---|---|---|---|
| 2021/0064417 A1* | 3/2021 | Jiang ....................... | H04L 43/50 |
| 2021/0232726 A1* | 7/2021 | Isaacs ..................... | G06F 30/20 |
| 2021/0240498 A1* | 8/2021 | Padmanabhan ..... | G06F 16/2246 |

\* cited by examiner

*Primary Examiner* — Tuan A Pham
(74) *Attorney, Agent, or Firm* — Kilpatrick Townsend & Stockton LLP

(57) ABSTRACT

System and methods discussed herein are directed to detecting the existence or modification of one or more data assets within a cloud-computing tenancy. The method may include obtaining, by a data management service, a plurality of connection data instances associated with a tenant. Cloud-computing data assets associated with the tenant can be identified from the plurality of connection data instances and presented to the user at a user interface. The user may select which data assets to add to a data catalog managed by the data management service. The data management service may be configured to monitor for new data assets or connections and/or for changes in data and/or connections of previously-selected data assets.

15 Claims, 10 Drawing Sheets

Discovered Data Assets

| Display Name | State | Description | Workload Type | Created |
|---|---|---|---|---|
| ∨ Autonomous Data Warehouse | | | | |
| ☑ Cross_Subnet | ⊗ Available | Lorum Ipsum | - | May 4, 2020, 23:17:46 UTC |
| ☐ CrossSubnetATP | ⊗ Available | Lorum Ipsum | - | May 4, 2020, 23:17:46 UTC |
| ☐ Test_ATP_NSG | ⊗ Available | Lorum Ipsum | - | May 4, 2020, 23:17:46 UTC |
| ☐ ADW_Public | ⊗ Available | Lorum Ipsum | - | May 4, 2020, 23:17:46 UTC |
| ∨ Autonomous Transaction Processing | | | | |
| ☐ Customer_ATP | ⊗ Available | Lorum Ipsum | - | May 4, 2020, 23:17:46 UTC |
| ☐ ATP_Bird | ⊗ Stopped | Lorum Ipsum | - | May 4, 2020, 23:17:46 UTC |
| ☐ ATP_Popular | ⊗ Terminated | Lorum Ipsum | - | May 4, 2020, 23:17:46 UTC |
| ☐ ATP_Public | ⊗ Available | Lorum Ipsum | - | May 4, 2020, 23:17:46 UTC |
| ∨ Object Storage Buckets | | | | |
| ☐ ADW_PE_Inst | ⊗ Available | Lorum Ipsum | - | May 4, 2020, 23:17:46 UTC |
| ☐ Bling_metering | ⊗ Available | Lorum Ipsum | - | May 4, 2020, 23:17:46 UTC |
| ☐ bucket_demo | ⊗ Available | Lorum Ipsum | - | May 4, 2020, 23:17:46 UTC |

TECHNIQUES FOR DATA ASSET DISCOVERY

CROSS-REFERENCES TO RELATED APPLICATIONS

The present application is a non-provisional of and claims priority and benefit from India Provisional Patent Application No. 202141024954, filed Jun. 4, 2021, and entitled "TECHNIQUES FOR MANAGING DISTRIBUTED COMPUTING COMPONENTS," the entire contents of which are incorporated herein by reference for all purposes.

BACKGROUND

Organizations use cloud computing environments to produce data using a variety of data sources and data services such as data lakes, data warehouses, analytics, and the like. The variety and amount of this data makes it difficult for data producers such as data engineers, data stewards, data scientists, and the like to find trusted data and understand that data to improve data governance. Discovering and managing this data is beneficial for various tasks. Some cloud computing systems include a data management service that enables users to create, search, and browse an inventory of data assets (e.g., any physical data store or stream of data such as a database, a cloud storage container, or a message stream), create and interact with glossaries and taxonomies, and control access to data catalog objects. These data assets may include one or more data entities (e.g., a collection of data such as a database table or view, logical files, etc.). A data entity can have many attributes that describe its data where the attributes each describe a data item with a name and a data type. The user can manually add data assets and entities and annotate these objects to improve productivity. If the organization has a large number of assets, the manual creation process can quickly become tedious.

BRIEF DESCRIPTION OF THE DRAWINGS

Various embodiments in accordance with the present disclosure will be described with reference to the drawings, in which:

FIG. 4 illustrates an example user interface for presenting information related to data assets discovered by the processes of FIGS. 2 and/or 3, in accordance with at least one embodiment.

DETAILED DESCRIPTION

Figure 1:
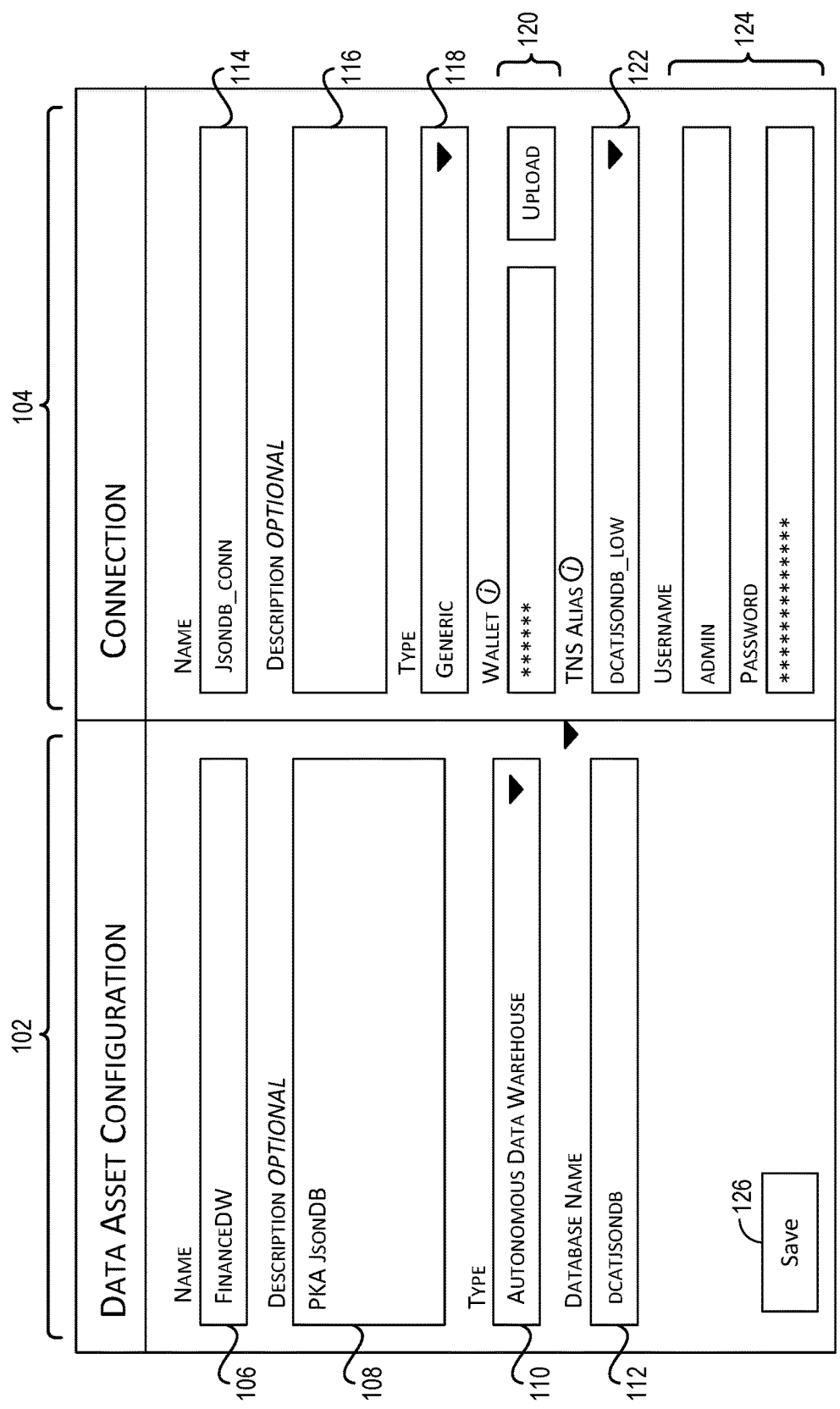
FIG. 1 illustrates an example user interface for manually adding a data asset to a data catalog, in accordance with at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to techniques for automatically populating a cloud-computing data catalog with data assets (e.g., one or more data source systems) associated with a tenant. Data Assets represent a data source, such as a database, an object store, a file that can be used as a source or target for data integration solutions. When a data asset is created, a default connection may be associated with the data asset. A connection is a user/password combination that has been issued to connect to the corresponding data source. Additional connections for a data asset can be created as needed. Each connection should give access to additional schemas and data entities to integrate. In some embodiments, the data catalog is managed by a data management service. The data management service is configured to manage a repository of these data assets and their corresponding data entities (e.g., data such as technical data, business data, etc., that may be contained in a variety of containers and/or formats). The various data entities associated with a given data asset may be referred to as the data asset's "metadata." Once a data asset is added to a data catalog managed by the data management service, the data asset's metadata may be harvested to provide the user insights as to the particular data stored by the data asset and/or its relationship to other data entities within the system (e.g., metadata of other data assets). Conventionally, the data management service is configured with these data assets and/or connections manually. Many large enterprises have hundreds to many thousands of data assets. Thus, it can take several hours to days to identify and manually configure these data assets for a given tenant. An automated discovery process is disclosed herein that identifies new data sources which can then be added to the data catalog.

Within the cloud computing ecosystem, the tenant is likely using a variety of services. By way of example, many tenancies utilize services that provide autonomous data warehouses, autonomous transaction processing, object storage, streaming, big data systems, clusters, Exadata database machines, and the like. These services may already have some knowledge of the tenant's data assets. These services, for example, may have previously connected to these data assets to obtain data for their various operations. In some cases, the tenant may have provided some information of the data assets via one or more services within the cloud-computing environment. These previously known connections can be leveraged to ascertain changes in these systems (e.g., an addition of a schema or a bucket, etc.). In some embodiments, in response to detecting a change (e.g., an addition of a data source) a data asset can be created and/or a previously known data asset may be augmented with this new information.

The techniques discussed herein provide for an improved user experience as the user need not waste time manually adding each and every data asset and/or entity. Instead, these data assets/entities are discovered automatically. Data that the user may have already provided via one service can be reused by the data management service to avoid having the user repetitively add this data to define a data asset and/or entity. The user is informed of the existence of these data assets and is provided control over which assets are added to a data catalog that is managed by the data management service. This process may be performed at any suitable time (e.g., on startup). In some embodiments, the discovery process can be run periodically and/or according to a schedule defined by the user. These techniques can save significant time and effort of the data owners and data administrators. Additionally, a user need not have prior knowledge and/or training setting up these types of data assets.

Moving on to FIG. 1, which illustrates an example user interface (UI) 100 for manually adding a data asset and corresponding connection to a data catalog, in accordance with at least one embodiment. UI 100 may include various data fields for identifying information of a particular data asset. As depicted in FIG. 1, UI 100 provides a number of interface elements (e.g., data fields, drop down menu options, checkboxes, buttons, and the like) for providing information regarding an autonomous data warehouse (e.g., a type of data asset). As depicted, UI 100 includes area 102 and area 104. Area 102 may include interface elements for providing information regarding a data asset configuration. Area 104 may include data fields for providing information regarding a connection to the data asset.

For example, data field 106 may be utilized to assign and/or provide a name of the data asset (e.g., "financeDW"). The user may utilize data field 108 for providing a textual description or annotation to be associated with the data asset (e.g., "PKA JsonDB"). In some embodiments, data field 108 may be optionally left empty. Area 102 may include drop down menu option 110 for identifying a type to be associated with the data asset (e.g., autonomous data warehouse). In some embodiments, area 102 may include data field 112 for providing a name to be associated with the data asset. Any suitable number and type of data elements may be provided within area 102, the specific data elements depicted in FIG. 1 is illustrative and not intended to limit the scope of this disclosure.

In some embodiments, area 104 may include any suitable number of interface elements for providing information related to establishing a connection to the data asset. In some embodiments, the particular number and type of interface elements may differ depending on the type of data asset and/or the type of connection selected. As a non-limiting example, area 104 may include data field 114. Data field 114 may be utilized to provide a name for the connection. Data field 116 may be utilized to provide a description and/or annotation for the connection. Data field 116 may optionally be left empty. In some embodiments, area 104 may include drop down menu option 118. Drop down menu option 118 may be utilized to select a type for the connection (e.g., generic, secure, etc.). Data fields 120 may be utilized by the user to identify a location for previously downloaded client credentials (e.g., which may then be uploaded and stored for subsequent use). Drop down menu option 122 may be utilized to select a Transparent Network Substrate (TNS) Alias for the connection. Credential fields 124 may be used to provide a user name and password (e.g., an administrator's user name that was set when, in this example, the autonomous data warehouse instance was created and a password that corresponds to that username). Button 126 may be utilized to save the information entered and/or selected using the interface elements of UI 100.

In some embodiments, UI 100 may be divided into multiple interfaces. By way of example, the interface elements of area 102 may be provided in one user interface/window, while the interface elements of area 104 are provided in a different user interface/window.

Figure 2:
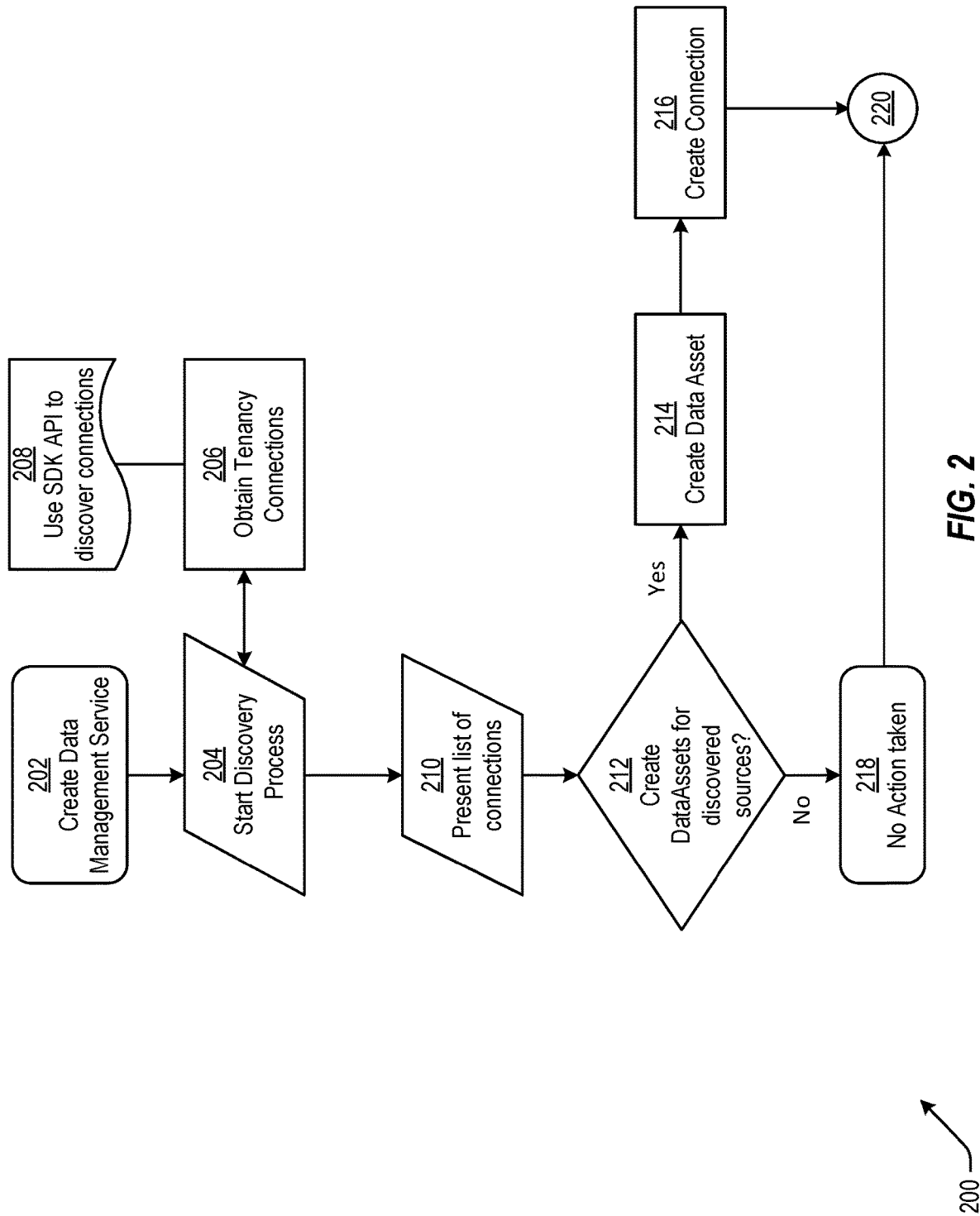
FIG. 2 illustrates an example process for creating a data asset, in accordance with at least one embodiment.

FIG. 2 illustrates an example method 200 for creating a data asset, in accordance with at least one embodiment. Method 200 may be executed by a data management service 202 (e.g., a service that operates in a cloud-computing environment). The data management service 202 may be configured to identify potential data assets for one or more tenancies of the cloud-computing environment. Once identified, the data assets and their corresponding connections can be added (e.g., upon user selection) to the data catalog managed by the data management service 202. Any suitable interface may be utilized to view and/or browse the existing data assets of the data catalog.

Method 200 can begin at 202, where a data management service instance can be created. The data management service may be created within a given tenancy (e.g., a tenancy associated with the user).

At 204, a discovery process may be initiated by the data management service. In some embodiments, this discovery process may be initiated in response to receiving user input indicating a request to discover data assets. For example, a menu option can be provided that, when selected by the user, initiates the discovery process. As another example, the discovery process may be initiated at 204 as part of a previously defined schedule and/or periodicity.

The discovery process initiated at 204 may include obtaining previously identified connections of the tenancy associated with the user at 206. In some embodiments, these connections can be obtained by initiating an application programming interface (API) call (e.g., an API provided by the cloud SDK) at 208. For example, the data management service may be configured to issue this application programming interface call to call. In some embodiments, a service within the cloud-computing environment may be configured to receive this API call as a request for connection data and, in response to receiving this API call, the service may be configured to scan the tenancy for any known connection data. In some embodiments, scanning the tenancy may include fetching, from a predefined location, all data (e.g., data asset information and connection data) corresponding to instances having a particular service type (e.g., "autonomous data warehouse," "autonomous transaction processing," "object storage," etc.). The connection data corresponding to these instances may include any suitable connection data (e.g., name, description, type, credentials, aliases, etc.) previously added by any user of the tenancy and corresponding to any suitable number of data sources of the tenancy. Said another way, the connections that have already been made within the tenancy may be leveraged to identify one or more data sources within the tenancy. The connection data may be returned in response to the API call. In some embodiments, a suitable number of API calls may be utilized. For example, a number of API call corresponding to each type of data asset may be utilized to obtain connection data corresponding to any suitable number of instances of a particular type of data asset. For example, all connections to any suitable number of autonomous data warehouses may be obtained via one API call while all connections to any suitable number of autonomous transaction processing assets may be obtained with another API call. In still further embodiments, all connections may be obtained with a single API call regardless of asset type.

At 210, a list of data sources corresponding to the connection data discovered at 208 may be presented to the user. In some embodiments, the user may be provided any suitable user interface elements to select any suitable number of these data sources. For example, interface element 410 of FIG. 4 may be an example of a selection option for selecting a particular instance of connection data associated with a particular data source (e.g., an autonomous data warehouse).

At 212, the data management service may be configured to identify whether one or more data assets are to be created. As a non-limiting example, the user may select any suitable number of data sources presented at 210 and then select an interface button "Create Data Assets" (e.g., the button 424 of FIG. 4). Upon selection, the data management service may identify whether one or more data sources were selected. If so, a data asset may be created for each selected data source. A corresponding connection may be stored at 216 for each data asset created. If no data sources were selected by the user, then the process may proceed from 212 to 218 where the method 200 may end without further action.

The method 200 may end at 220.

Figure 3:
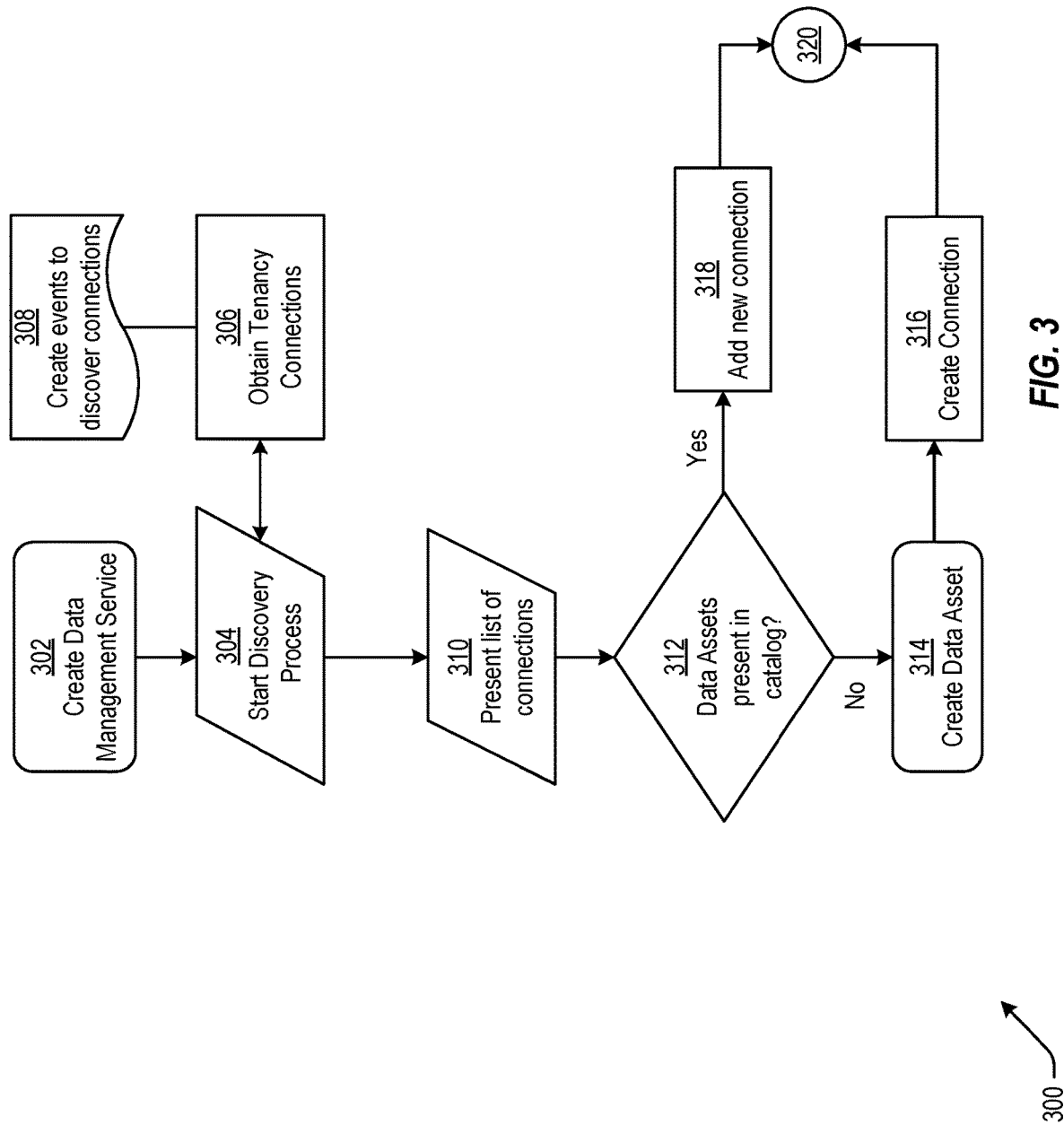
FIG. 3 illustrates another example process for creating a data asset, in accordance with at least one embodiment.

FIG. 3 illustrates another example method 300 for creating a data asset, in accordance with at least one embodiment. Method 300 may be executed by a data management service 302 (e.g., an example of data management service 202 of FIG. 2). The data management service 302 may be configured to identify the existence and/or modification of data assets for one or more tenancies of the cloud-computing environment. Once identified, the data assets and their corresponding connections can be added to the data catalog managed by the data management service 302. Any suitable interface may be utilized to view and/or browse the existing data assets of the data catalog.

Method 300 can begin at 302, where a data management service instance can be created. An instance of the data management service may be created within a given tenancy (e.g., a tenancy associated with the user).

At 304, a discovery process may be initiated by the data management service. In some embodiments, this discovery process may be initiated in response to receiving user input indicating a request to discover data assets. For example, a menu option can be provided that, when selected by the user, initiates the discovery process. As another example, the discovery process may be initiated at 304 as part of a previously defined schedule and/or periodicity.

The discovery process initiated at 304 may include obtaining previously identified connections of the tenancy associated with the user at 306. In some embodiments, these connections can be obtained based at least in part on creating one or more events with an event service at 308. Each event may correspond to a particular set of conditions that, when met, may cause and event/notification to be sent to an event service to indicate the event has taken place (e.g., a connection has been made). For example, the data management service may be configured register events corresponding to the creation of any suitable data asset (e.g., object storage, data warehouses, autonomous transaction processing, and the like). A corresponding event may be created that would be triggered upon creating and/or modifying a connection. The particular number and type of events created by the data management service and registered with the event service may be predefined. Each event may include a tenancy identifier to indicate a tenancy to which an event relates. In some embodiments, the data catalog for a given tenancy may be configured to ignore events that do not correspond to the tenancy for which the data catalog was created. Alternatively, the event service may be configured to notify only the data catalog instances corresponding to the same tenancy as the event based at least in part on matching the tenancy identifier of the event to a tenancy identifier corresponding to the data catalog. In some embodiments, an event service within the cloud-computing environment may be configured to receive data indicating that an event has transpired (e.g., a connection was made to object storage). The event service can identify data source information (e.g., name, description, state, type, etc.) and connection data (e.g., name, description, type, credentials, aliases, etc.) and pass this data to one or more consumers of the event (e.g., the data management service). Thus, as new data sources and/or connections are created, the data management service may be notified of these changes.

At 310, a list of data assets and corresponding connections may be presented to the user. The list may include each instance of connection data (e.g., corresponding to a particular data source and connection) discovered in response to creating the events at 308. In some embodiments, the user may be provided any suitable user interface elements to select any suitable number of these data sources. For example, interface element 410 of FIG. 4 may be an example of a selection option for selecting a particular instance of connection data associated with a particular data source (e.g., an autonomous data warehouse). In other embodiments, the user need not make selections at all, rather any data asset and/or connection data discovered via the events created at 308 may be used to update the data catalog.

At 312, the data management service may be configured to identify whether a data asset corresponding to a given entry of the list is already present in the catalog. If one or more data assets do not already exist in the data catalog, those data assets may be created at 314. The corresponding connection data may be stored at 316 for each data asset created.

If a data asset already exists for one or more entries of the list, the data assets corresponding to those entries may be updated with the new connection data at 318.

The method 300 may end at 320.

After a data asset and/or connection is added to the data catalog in accordance with methods 200 or 300, metadata may be harvested from the data asset utilizing the connection data. Thus, existing connections can be leveraged and utilized to populate the data catalog with metadata from the corresponding data assets.

FIG. 4 illustrates an example user interface (UI) 400 for presenting data asset information, in accordance with at least one embodiment. In some embodiments, the UI 400 may be presented based at least in part on user selection (e.g., in response to the user selecting a menu option), periodically (e.g., every 2 hours, 30 minutes, etc.), according to a schedule, or at any suitable time. In some embodiments, the UI 400 can be updated in real time.

UI 400 may include area 402 for displaying information regarding discovered assets. In some embodiments, the data assets listed within area 402 may have been discovered using the processes 200 and/or 300 discussed above in connection with FIGS. 2 and 3, respectively. In some embodiments, the data assets listed, grouped, and/or sorted within area 402 according to any suitable metadata associated with the data asset. By way of example, FIG. 4 depicts discovered data assets as being grouped by asset type. Data assets 404, for example, include all discovered autonomous data warehouse instances, data assets 406 include all discovered autonomous transaction processing, and data assets 408 include all discovered object storage buckets. Any suitable number of groupings may be presented. In some embodiments, these groups may be expanded and/or collapsed via a corresponding interface element similar to interface element 410.

Any suitable information pertaining to each discovered data asset may be presented in UI 400. As a non-limiting example, UI 400 may include columns 412-420. Column 412 may be utilized to display the name associated with each data asset. Column 414 may be used to display a state associated with the data asset (e.g., available, stopped, terminated, etc.). Column 416 may be used to present a description associated with the data asset. Column 418 may be utilized to present a workload type (e.g., batch, analytic, transactional, high performance, database, etc.). Column 420 may be utilized to present a timestamp and/or a creation time corresponding to a time at which the data asset was created.

In some embodiments, each data asset discovered via the processes discussed herein may be presented with an interface option for selecting the data asset. By way of example, checkbox 422 may be utilized as a selection option for selecting the autonomous data warehouse named "Cross Subnet." In some embodiments, the user may select any suitable number and/or combination of the discovered data assets. In some embodiments, the user may select option 424 to create data asset objects that are added to the data catalog managed by the data management service. Upon selecting option 424, a data asset object may be created for each data asset previously selected by the user (e.g., selected via checkbox 422, for example) and added to the data catalog. Once added, any suitable user interface may be utilized to enable the user to select one or more data assets and view any suitable metadata (e.g., technical data, business data, etc.) associated with that data asset.

Figure 5:
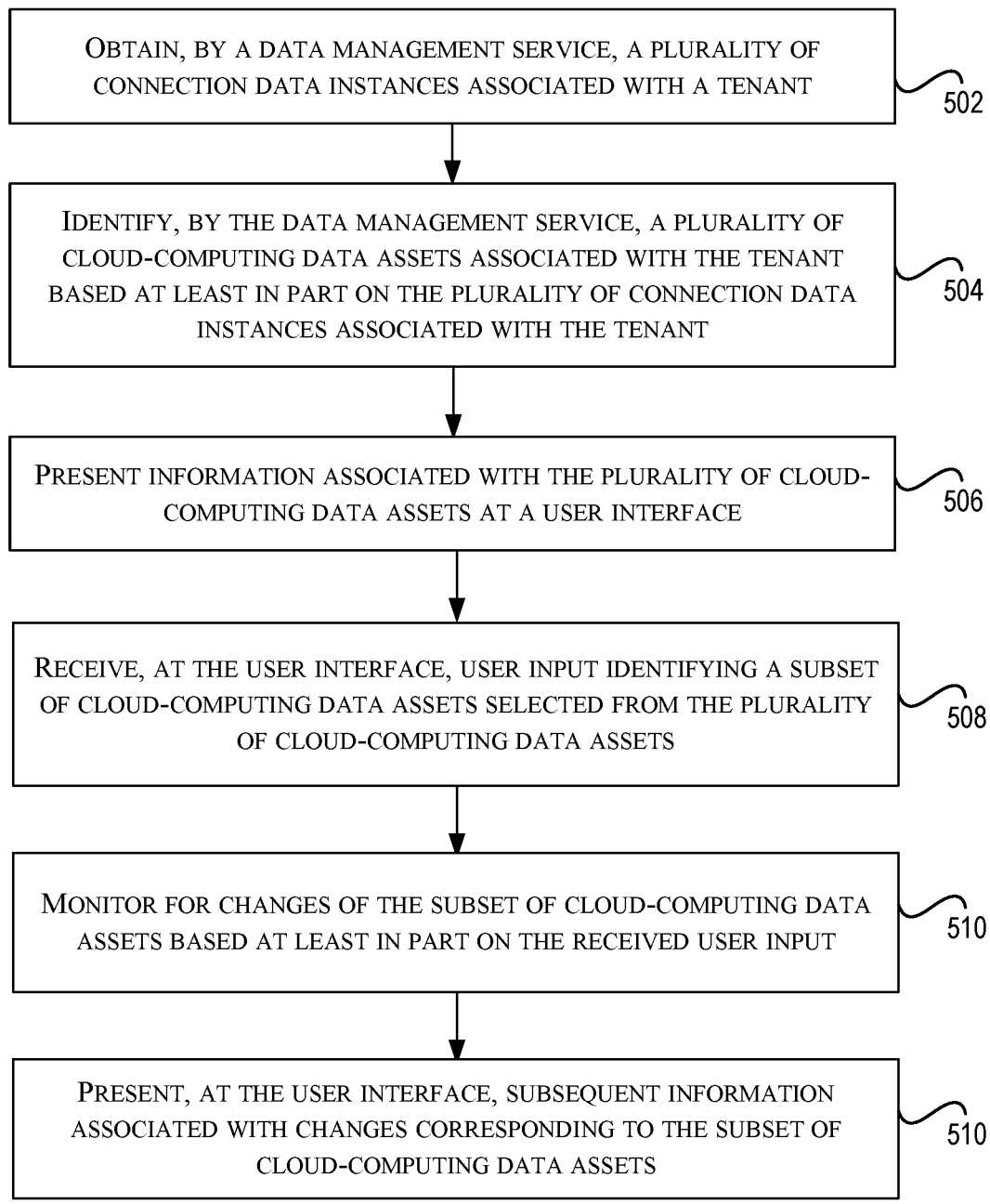
FIG. 5 illustrates an example method for monitoring a cloud-computing environment for changes in data assets, in accordance with at least one embodiment.

FIG. 5 illustrates an example method for monitoring a cloud-computing environment for changes in data assets, in accordance with at least one embodiment. The method 500 may be performed by a data management service provided as part of one or more of the cloud-computing environments (e.g., IaaS patterns) discussed below in connection with FIGS. 6-10.

The method 500 may begin at 502, where a plurality of connection data instances associated with a tenant may be obtained (e.g., by a data management service such as the data management service 202 of FIG. 2). In some embodiments, these connection data instances may be obtained via API call as described in connection with FIG. 2 or via one or more events as described in connection with FIG. 3. In some embodiments, the plurality of connection instances individually corresponds to access to a given data source obtained utilizing a particular set of user credentials.

At 504, a plurality of cloud-computing data assets associated with the tenant may be identified (e.g., by the data management service) based at least in part on the plurality of connection data instances associated with the tenant. In some embodiments, identifying the plurality of cloud computing data assets further comprises transmitting (e.g., to a cloud computing infrastructure service) a request comprising an identifier associated with the tenant. In some embodiments, the recipient of the request (e.g., the cloud computing infrastructure service such as control plane app 624 of FIG. 6) may utilize the identifier for the tenant to retrieve data asset information and/or connection data associated with that identifier.

At 506, information associated with the plurality of cloud-computing data assets may be presented (e.g., by the data management service) at a user interface (e.g., the user interface 400 of FIG. 4). In some embodiments, presenting the plurality of cloud-computing data assets at the user interface comprises presenting, at the user interface, a plurality of graphical user interface elements corresponding to the plurality of computing data assets. For example, the interface element 410 may correspond to a single entry of the list provided via the UI 400. The user input being received based at least in part on selection of one or more of the plurality of graphical user interface elements.

At 508, user input may be received at the user interface (e.g., the user interface 400). The user input may identify a subset of cloud-computing data assets selected from the plurality of cloud-computing data assets. By way of example, the user input may indicate selections based at least in part on the user selecting one or more interface elements such as interface element 410 of FIG. 4.

At 510, the data management service may monitor for changes of the subset of cloud-computing data assets based at least in part on the received user input. For example, the data assets selected by the user via the UI 400 may be monitored. In some embodiments, all data assets and/or connection may be monitored by the data management service for subsequent changes. As a non-limiting example, the data management service may subscribe to one or more events that correspond to a particular type of data asset. For example, the event may be triggered when a new connection is made to a/any autonomous data warehouse service and/or when a new autonomous data warehouse service is instantiated. In some embodiments, monitoring for changes of the subset of cloud-computing data assets further comprises subscribing to one or more event types corresponding to a plurality of events transmitted by a cloud-computing infrastructure service. The plurality of events may be associated with at least one of the subset of cloud-computing data assets.

At 512, subsequent information associated with changes corresponding to the subset of cloud-computing data assets may be presented at the user interface (e.g., by the data management service). In some embodiments, the information presented at 512 may be provided to the data management service in the event (e.g., an event triggered by an event service of the cloud computing environment).

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
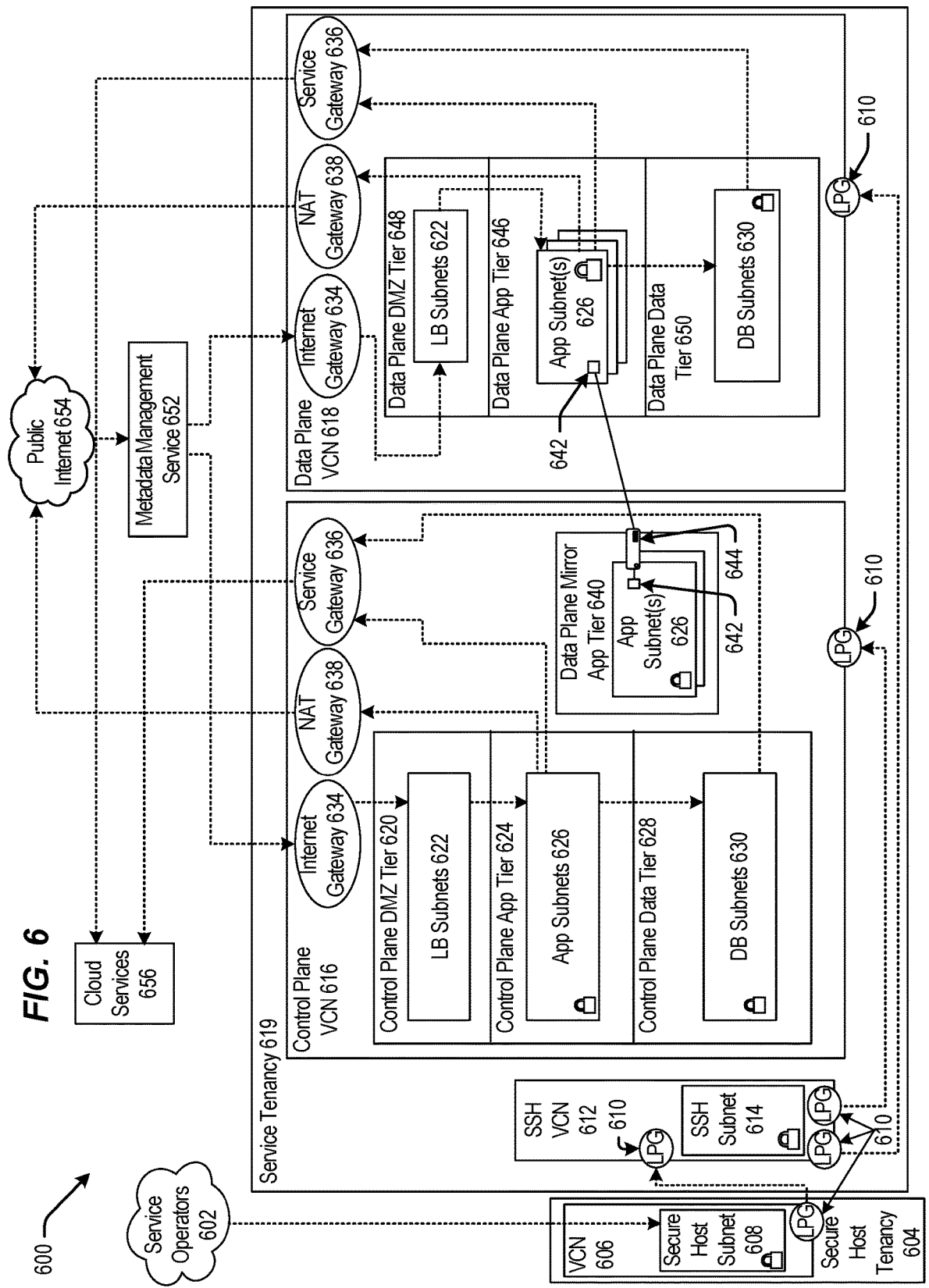
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers, and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
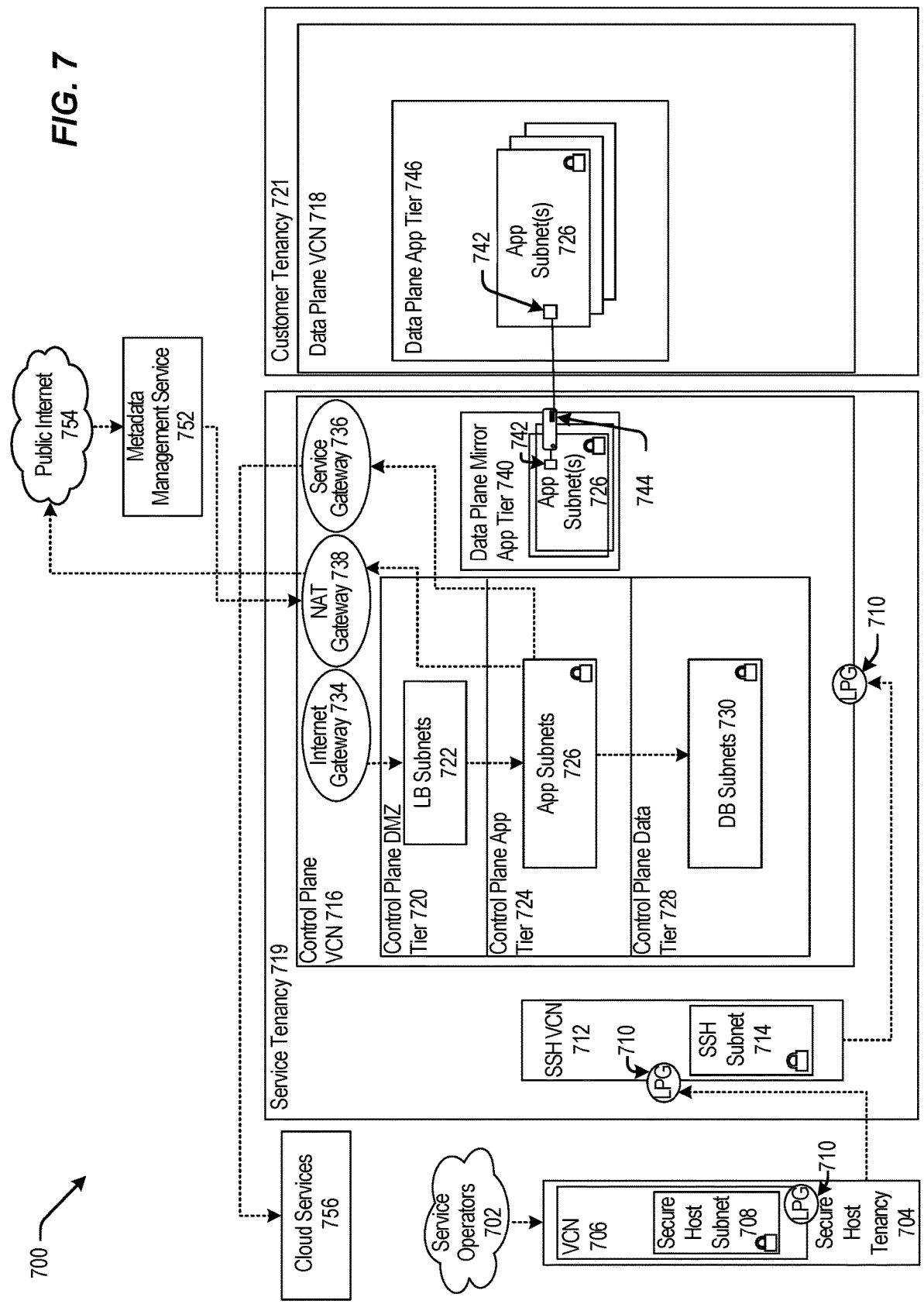
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
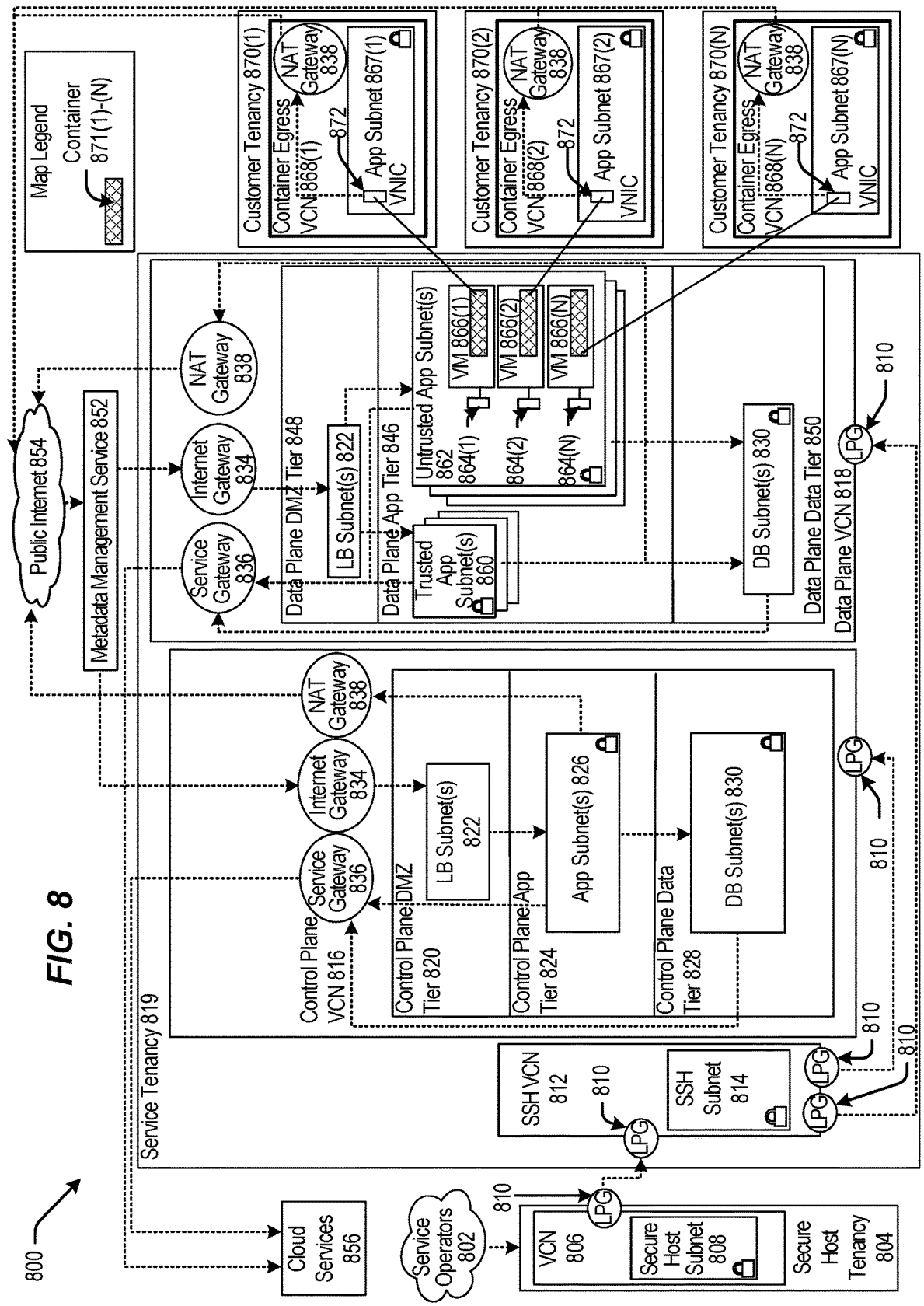
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
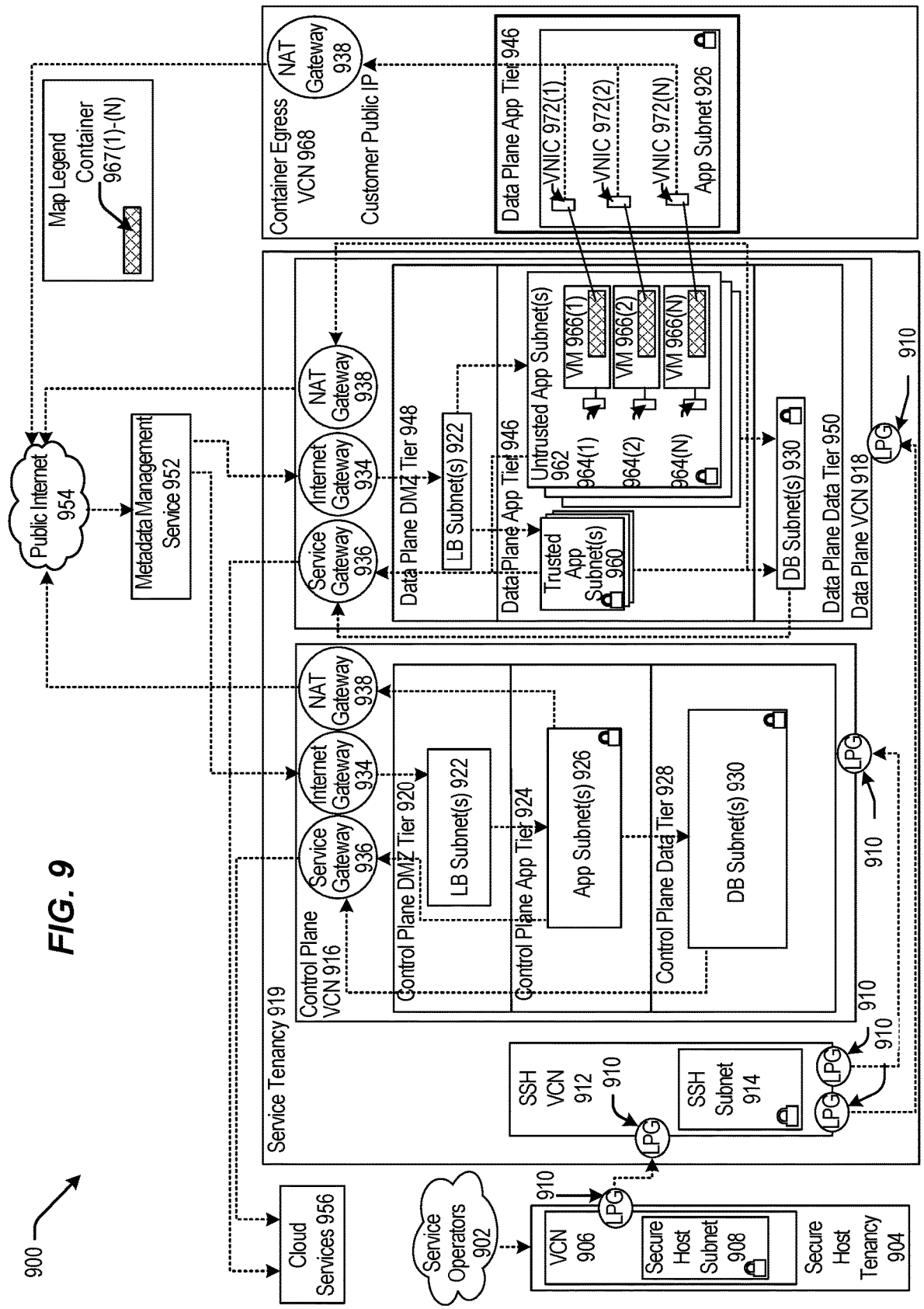
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
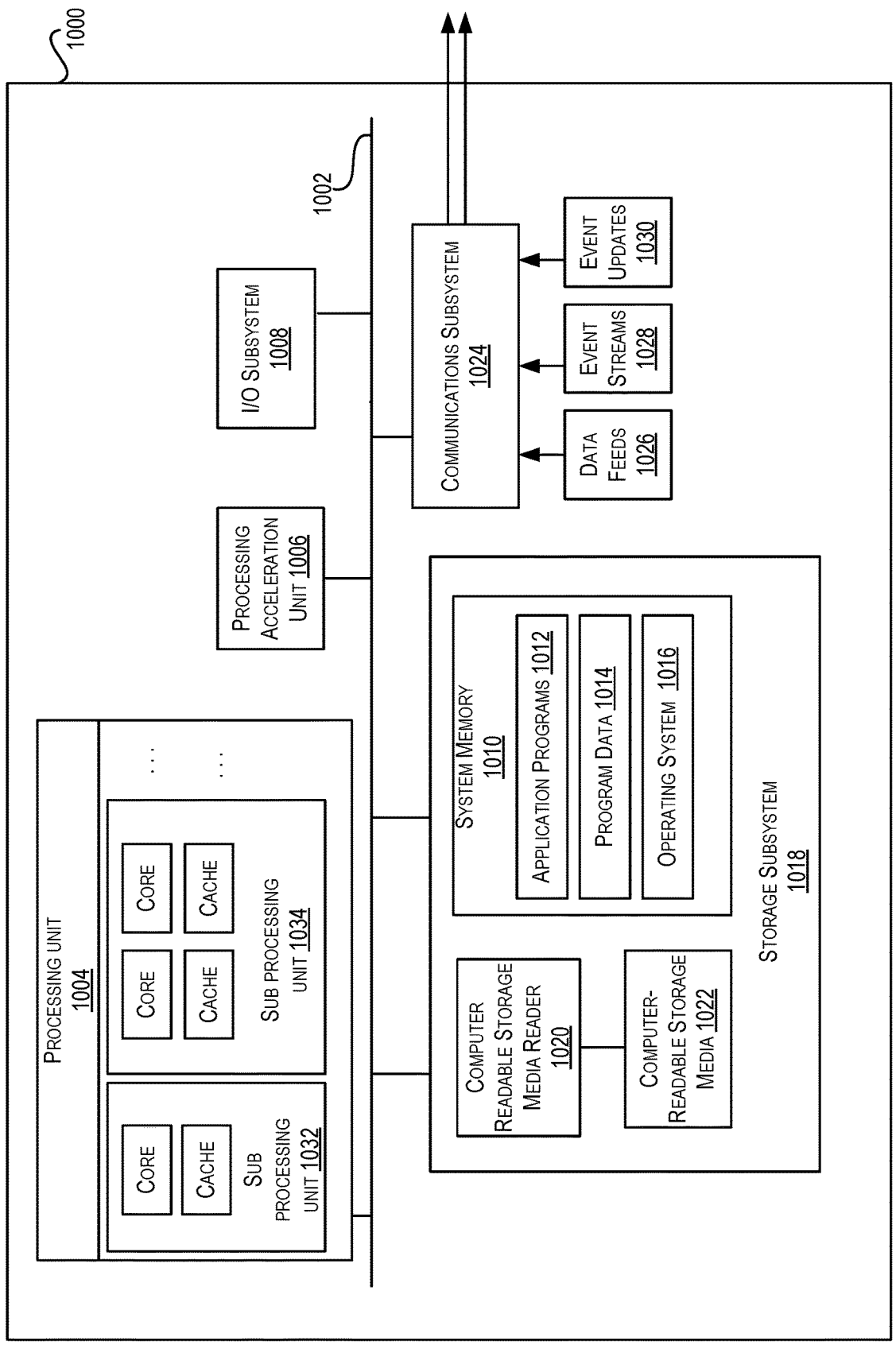
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure.

Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising;
    transmitting, by a data management service to a cloud computing infrastructure service configured to provision cloud computing infrastructure components and deploy code to provisioned cloud computing infrastructure components, a request comprising an identifier associated with a tenant;
    receiving, by the data management service, a plurality of connection data instances associated with the tenant, each of the plurality of connection data instances being associated with a respective connection established between a user device and a cloud-computing data source associated with the tenant;
    identifying, by the data management service, existence of a plurality of cloud-computing data sources associated with the tenant based at least in part on identifying, from the plurality of connection data instances associated with the tenant, that a connection has been made between a respective user device and a respective cloud-computing data source;
    presenting connection data associated with the plurality of cloud-computing data sources at a user interface;
    receiving, at the user interface, user input identifying a subset of cloud-computing data sources selected from the plurality of cloud-computing data sources;
    in accordance with receiving the user input, monitoring, by the data management service, for creation of new cloud-computing data sources based at least in part on obtaining additional connection data instances associated with new connections established with the new cloud-computing data sources; and
    presenting, at the user interface, additional connection data associated with the new cloud-computing data sources that are detected based at least in part on the monitoring.

2. The computer-implemented method of claim 1, wherein presenting the plurality of cloud-computing data sources at the user interface comprises presenting, at the user interface, a plurality of graphical user interface elements corresponding to the plurality of computing data sources, the user input being received based at least in part on selection of one or more of the plurality of graphical user interface elements.

3. The computer-implemented method of claim 1, wherein the monitoring for the creation of the new cloud-computing data sources further comprises subscribing to one or more events types of a plurality of events transmitted by the cloud computing infrastructure service, the plurality of events being individually associated with creation of a corresponding connection to at least one of the new cloud-computing data sources.

4. The computer-implemented method of claim 1, further comprises:
   obtaining, by the data management service from the cloud computing infrastructure service, a plurality of subsequent connection data instances associated with the tenant;
   identifying, by the data management service, an additional plurality of cloud-computing data sources associated with the tenant based at least in part on the subsequent plurality of connection data instances; and
   presenting, at the user interface, corresponding connection data associated with the additional plurality of cloud-computing data sources at the user interface;
   receiving, at the user interface, subsequent user input identifying an additional subset of cloud-computing data assets selected from the additional plurality of cloud-computing data sources; and
   monitoring, by the data management service, for changes of the additional subset of cloud-computing data sources based at least in part on receiving the subsequent user input.

5. The computer-implemented method of claim 1, wherein the plurality of connection data instances individually correspond to access to a given data source obtained utilizing a particular set of user credentials.

6. A cloud-computing system, comprising:
   one or more hardware processors; and
   one or more memories storing computer-executable instructions that, when executed by the one or more hardware processor, cause a data management service to:
      transmit, to a cloud computing infrastructure service configured to provision cloud computing infrastructure components and deploy code to provisioned cloud computing infrastructure components, a request comprising an identifier associated with a tenant;
      receive a plurality of connection data instances associated with the tenant, each of the plurality of connection data instances being associated with a respective connection established between a user device and a cloud-computing data source associated with the tenant;
      identify existence of a plurality of cloud-computing data sources associated with the tenant based at least in part on identifying, from the plurality of connection data instances associated with the tenant, that a connection has been made between a respective user device and a respective cloud-computing data source;
      present connection data associated with the plurality of cloud-computing data sources at a user interface;
      receive, at the user interface, user input identifying a subset of cloud-computing data sources selected from the plurality of cloud-computing data sources;
      in accordance with receiving the user input, monitor, by the data management service, for creation of new cloud-computing data sources based at least in part on obtaining additional connection data instances associated with new connections established with the new cloud-computing data sources; and
      present, at the user interface, additional connection data associated with the new cloud-computing data sources that are detected based at least in part on the monitoring.

7. The cloud-computing system of claim 6, wherein presenting the plurality of cloud-computing data sources at the user interface comprises presenting, at the user interface, a plurality of graphical user interface elements corresponding to the plurality of computing data sources, the user input being received based at least in part on selection of one or more of the plurality of graphical user interface elements.

8. The cloud-computing system of claim 6, wherein the monitoring for the creation of the new cloud-computing data sources further comprises subscribing to one or more events types of a plurality of events transmitted by the cloud computing infrastructure service, the plurality of events being individually associated with creation of a corresponding connection to at least one of the new cloud-computing data sources.

9. The cloud-computing system of claim 6, wherein the data management service is further configured to:
   obtain a plurality of subsequent connection data instances associated with the tenant;
   identify an additional plurality of cloud-computing data sources associated with the tenant based at least in part on the subsequent plurality of connection data instances; and
   present, at the user interface, corresponding connection data associated with the additional plurality of cloud-computing data sources at the user interface;
   receive, at the user interface, subsequent user input identifying an additional subset of cloud-computing data assets selected from the additional plurality of cloud-computing data sources; and
   monitor, by the data management service, for changes of the additional subset of cloud-computing data sources based at least in part on receiving the subsequent user input.

10. The cloud-computing system of claim 6, wherein the plurality of connection data instances individually correspond to access to a given data source obtained utilizing a particular set of user credentials.

11. A non-transitory computer-readable storage medium comprising executable instructions that, when executed with one or more processors of a computing device, cause the computing device to:
   transmit, to a cloud computing infrastructure service configured to provision cloud computing infrastructure components, a request comprising an identifier associated with a tenant;
   receive, from the cloud computing infrastructure service, a plurality of connection data instances associated with the tenant, each of the plurality of connection data instances being associated with a respective connection established between a user device and a cloud-computing data source associated with the tenant;
   identify existence of a plurality of cloud-computing data sources associated with the tenant based at least in part on identifying, from the plurality of connection data instances associated with the tenant, that a connection has been made between a respective user device and a respective cloud-computing data source;
   present connection data associated with the plurality of cloud-computing data sources at a user interface;
   receive, at the user interface, user input identifying a subset of cloud-computing data sources selected from the plurality of cloud-computing data sources;

in accordance with receiving the user input, monitor, by the computing device, for creation of new cloud-computing data sources based at least in part on obtaining additional connection data instances associated with new connections established with the new cloud-computing data sources; and present, at the user interface, additional connection data associated with new cloud-computing data sources that are detected based at least in part on the monitoring.

12. The non-transitory computer-readable storage medium of claim 11, wherein presenting the plurality of cloud-computing data sources at the user interface comprises presenting, at the user interface, a plurality of graphical user interface elements corresponding to the plurality of computing data sources, the user input being received based at least in part on selection of one or more of the plurality of graphical user interface elements.

13. The non-transitory computer-readable storage medium of claim 11, wherein the monitoring for the creation of the new cloud-computing data sources further comprises subscribing to one or more events types of a plurality of events transmitted by the cloud computing infrastructure service, the plurality of events being individually associated with creation of a corresponding connection to at least one of the new cloud-computing data sources.

14. The non-transitory computer-readable storage medium of claim 11, wherein the computing device is further configured to:
  obtain a plurality of subsequent connection data instances associated with the tenant;
  identify an additional plurality of cloud-computing data sources associated with the tenant based at least in part on the subsequent plurality of connection data instances; and
  present, at the user interface, corresponding connection data associated with the additional plurality of cloud-computing data sources at the user interface;
  receive, at the user interface, subsequent user input identifying an additional subset of cloud-computing data assets selected from the additional plurality of cloud-computing data sources; and
  monitor, by the computing device, for changes of the additional subset of cloud-computing data sources based at least in part on receiving the subsequent user input.

15. The non-transitory computer-readable storage medium of claim 11, wherein the plurality of connection data instances individually correspond to access to a given data source obtained utilizing a particular set of user credentials.

* * * * *